(12) United States Patent
Grein et al.

(10) Patent No.: US 10,253,171 B2
(45) Date of Patent: Apr. 9, 2019

(54) THERMOPLASTIC POLYOLEFINS WITH HIGH FLOWABILITY AND EXCELLENT SURFACE QUALITY PRODUCED BY A MULTISTAGE PROCESS

(71) Applicant: Borealis AG, Vienna (AT)

(72) Inventors: Christelle Grein, Linz (AT); Klaus Bernreitner, Linz (AT)

(73) Assignee: Borealis AG, Vienna (AT)

( * ) Notice: Subject to any disclaimer, the term of this patent is extended or adjusted under 35 U.S.C. 154(b) by 171 days.

(21) Appl. No.: 14/057,818

(22) Filed: Oct. 18, 2013

(65) Prior Publication Data

US 2014/0045994 A1 Feb. 13, 2014

Related U.S. Application Data

(62) Division of application No. 12/737,147, filed as application No. PCT/EP2009/057256 on Jun. 12, 2009.

(30) Foreign Application Priority Data

Jun. 16, 2008 (EP) .................................... 08158320

(51) Int. Cl.
| | |
|---|---|
| *B01J 31/34* | (2006.01) |
| *C08L 23/12* | (2006.01) |
| *C08F 210/06* | (2006.01) |
| *C08F 210/16* | (2006.01) |
| *C08F 297/08* | (2006.01) |
| *C08L 23/10* | (2006.01) |
| *C08F 110/02* | (2006.01) |
| *C08L 23/16* | (2006.01) |

(52) U.S. Cl.
CPC ............ *C08L 23/12* (2013.01); *C08F 210/06* (2013.01); *C08F 210/16* (2013.01); *C08F 297/08* (2013.01); *C08F 297/083* (2013.01); *C08L 23/10* (2013.01); *C08F 110/02* (2013.01); *C08L 23/16* (2013.01); *C08L 2205/02* (2013.01); *Y02P 20/52* (2015.11)

(58) Field of Classification Search
CPC .... B01J 31/38; B01J 31/0235; B01J 31/0237; B01J 31/0209; B01J 2523/22; B01J 2523/41; B01J 2523/47
USPC .......................................... 502/232; 526/126
See application file for complete search history.

(56) References Cited

U.S. PATENT DOCUMENTS

| | | | | |
|---|---|---|---|---|
| 5,767,215 | A * | 6/1998 | Garoff et al. | ................. 526/348 |
| 5,969,049 | A | 10/1999 | Ueda et al. | |
| 6,953,815 | B2 | 10/2005 | Enomoto et al. | |
| 2004/0044107 | A1 | 3/2004 | Kikuchi et al. | |
| 2006/0217501 | A1 | 9/2006 | Migone et al. | |
| 2007/0203298 | A1 * | 8/2007 | Massari et al. | ................ 525/191 |
| 2008/0033104 | A1 * | 2/2008 | Grein | ...................... C08L 23/12 |
| | | | | 524/584 |

FOREIGN PATENT DOCUMENTS

| | | | |
|---|---|---|---|
| EP | 0491566 A2 | 6/1992 | |
| EP | 0887379 B1 | 12/2004 | |
| EP | 1538167 A1 * | 6/2005 | ............ C08F 110/02 |
| EP | 1600480 A1 | 11/2005 | |
| JP | 57145113 A | 9/1982 | |
| JP | 9040821 A | 2/1997 | |
| JP | 2004307657 A | 11/2004 | |
| WO | 8707620 A1 | 12/1987 | |
| WO | 9219653 A1 | 11/1992 | |
| WO | 9219658 A1 | 11/1992 | |
| WO | 9924478 A1 | 5/1999 | |
| WO | 9924479 A1 | 5/1999 | |
| WO | 9924501 A1 | 5/1999 | |
| WO | 0068315 A1 | 11/2000 | |
| WO | 2004000899 A1 | 12/2003 | |
| WO | 2004111095 A1 | 12/2004 | |
| WO | 2008015113 A2 | 2/2008 | |

OTHER PUBLICATIONS

Ullmann's Encyclopedia of Industrial Chemistry; Fifth, Completely Revised Edition; vol. A26; VCH Verlagsgesellschaft mbH; Weinheim, Germany; 1995.

* cited by examiner

Primary Examiner — Rip A Lee
(74) Attorney, Agent, or Firm — Warn Partners, P.C.

(57) ABSTRACT

Reactor grade thermoplastic polyolefins with high flowability and excellent surface quality comprising (A) 40-90 wt % of a propylene homo- or copolymer matrix with an MFR in accordance with ISO 1 133 (230° C., 2.16 kg load) of ≥200 g/10 min and (B) 2-30 wt % of an elastomeric ethylene-propylene copolymer having an intrinsic viscosity IV (according to ISO 1628 with decalin as solvent) of ≤2.8 dl/g and an ethylene content of >50 to 80 wt % and (C) 8-30 wt % of an elastomeric ethylene-propylene copolymer having an intrinsic viscosity IV (according to ISO 1628 with decalin as solvent) of 3.0-6.5 dl/g and an propylene content of 50 to 80 wt %, the reactor grade thermoplastic polyolefins being obtainable by a multistage polymerization process with at least 3 polymerization steps in the presence of a catalyst system comprising (i) a Ziegler-Natta procatalyst which contains a trans-esterification product of a lower alcohol and a phthalic ester and (ii) an organometallic cocatalyst and (iii) external donor represented by formula (I) $Si(OCH_2CH_3)_3$ $(NR^1R^2)$ wherein $R^1$ and $R^2$ can be the same or different a represent a hydrocarbon group having 1 to 12 carbon atoms, as well as the use of these reactor grade thermoplastic polyolefins and molded articles produced from them.

12 Claims, No Drawings

THERMOPLASTIC POLYOLEFINS WITH HIGH FLOWABILITY AND EXCELLENT SURFACE QUALITY PRODUCED BY A MULTISTAGE PROCESS

This application is a divisional of U.S. patent application Ser. No. 12/737,147 filed Dec. 13, 2010, which is a National Stage of International Application No. PCT/EP2009/057256, filed Jun. 12, 2009. This application claims priority to European Patent Application No. 08158320.5 filed on Jun. 16, 2008. The disclosures of the above applications are incorporated herein by reference.

This invention is in the field of thermoplastic polyolefins and more specifically reactor grade thermoplastic polyolefins (RTPO).

The invention is further directed to RTPOs having high flowability and excellent surface quality, when molded into articles of manufacture, especially for automotive applications, a process for producing them and their use.

Furthermore the invention is related to the use of a special Ziegler-Natta procatalyst, which contains a trans-esterification product of a lower alcohol and a phthalic ester in combination with a special external donor for the production of RTPOs with high flowability and excellent surface quality.

STATE OF THE ART

Thermoplastic polyolefins (TPOs), which typically comprise polypropylene and an elastomer, have many desirable properties, e.g. lightweight, durability, low costs, etc., that make them an attractive material for the construction of many interior and exterior automotive parts. There are two types of TPOs which essentially differ in their method of preparation. The first, which is commonly referred to as "compound grade TPO", is made by physically blending polypropylene with elastomer. The second, which is commonly referred to as "reactor grade TPO" (RTPO) and is more economical to produce than compound grade TPO, is made by first polymerizing propylene to polypropylene and then polymerizing elastomer components, such as ethylene and propylene, in the presence of the polypropylene.

The RTPOs are known to be suitable for injection molding to produce large, shaped articles, for example for automotive applications, especially bumpers.

Unfortunately the problem of optical irregularity arises during injection molding of such large articles due to the necessary long flow paths of the resin.

Such surface defects, which are also known as "Tiger-stripes" or flow marks, are a common problem for surface quality respectively appearance in plastic industry. Tiger-stripes, as known in the plastic industry, describe a visible periodic inhomogeneity in surface gloss. Mostly these are alternating dull (or rough) and glossy (or smooth) areas on the surface of injection molded or extruded plastic parts, which surface should be glossy (or smooth) all over.

Many attempts to avoid these surface defects, while keeping a good balance of other physical properties have been made in the past.

It has however been found, that either the occurrence of flow marks could not be entirely prevented, or the physical properties of the polymer compositions were unsatisfactory.

Furthermore it is desired that the RTPOs exhibit as high values of melt flow rate (MFR) as possible in order to improve processability of the RTPOs for injection molding.

For example WO 2004/000899 describes reactor grade thermoplastic polyolefins on the basis of a polypropylene matrix material including bimodal rubber compositions, whereby the two rubber parts have differentiated Mw (respectively intrinsic viscosity IV) and the low IV rubber is ethylene rich.

These RTPOs are produced in a multistage process comprising at least one slurry reactor and two gas phase reactors. A particularly preferred catalyst system is, according to WO 2004/000899, a high yield Ziegler-Natta catalyst having a catalyst component, a cocatalyst and optionally an external donor, or a metallocene catalyst, having a bridged structure giving high stereoregularity and which, as an active complex, is impregnated on a carrier. No further details regarding the used catalyst and external donor are given.

The RTPOs produced according to WO 2004/000899 show improved surface toughness in terms of scratch resistance and can be used for producing car interiors and exteriors, like bumpers, dashboards and the like, where improved scratch resistance properties are needed.

According to the Examples the RTPOs exhibit an MFR of at most 13.2 g/10 min.

From experience it is known that RTPOs, produced according to WO 2004/000899 show flow marks.

EP 1 600 480 describes an improved propylene polymer composition on the basis of a polypropylene matrix material with an MFR in accordance with ISO 1133 (230° C., 2.16 kg)≥80 g/10 min, including bimodal rubber compositions, whereby the two rubber parts have differentiated Mw (IV) and the low IV rubber is ethylene rich.

The RTPO is mixed with an elastomeric ethylene-1-octene copolymer, having an ethylene content of at least 80 mol % and having a MFR in accordance with ISO 1133 (190° C., 2.16 kg) of 3-100 g/10 min, and with an inorganic filler. These RTPOs are, according to EP 1 600 480, suitable for automotive applications because they have excellent impact strength/stiffness balance, high flowability and are not susceptible to the occurrence of flow marks.

The RTPO is produced in a multistage process using a Ziegler-Natta catalyst or a metallocene. According to the examples ZN104 (commercially available from Lyondell-Basell), triethylaluminium as cocatalyst and dicyclopentyldimethoxysilane as external donor are used.

According to the Examples of EP 1 600 480 MFR-values of at most 100 g/10 min for the propylene matrix and of at most 17.6 g/10 min of the final RTPO can be achieved by using this combination of catalyst, cocatalyst and external donor.

It is known by the art skilled man that the highest achievable MFR of the matrix of the base resin used according to EP 1 600 480 hardly exceeds 120 due to the high amounts of fines produced and high hydrogen response generated for these flowability conditions.

Accordingly, although much development work has been done in the field of RTPOs, there remains a continuing search for alternative or improved RTPOs with desirable properties, such as excellent surface quality, good impact strength/stiffness balance and high flowability e.t.c.

It was therefore an object of the invention to provide a propylene polymer composition, which can be injection molded into large shaped articles, which articles show no flow marks and which composition simultaneously shows a good impact strength/stiffness balance and high flowability.

This object was achieved by using a special Ziegler-Natta procatalyst which contains a trans-esterification product of a lower alcohol and a phthalic ester in combination with a special external donor. Surprisingly this special Ziegler-Natta procatalyst in combination with a special external donor can be used for the production of a great variety of RTPOs with high flowability and excellent quality, like RTPOs on the basis of a polypropylene matrix including cross-bimodal rubber compositions, nucleated or non-nucleated RTPOs, with different multistage processes, like Borstal® from Borealis or Spheripol® from LyondellBasell.

Thus in a first aspect, the present invention is therefore directed to reactor grade thermoplastic polyolefins with high flowability and excellent surface quality comprising (A) 40-90 wt % of a propylene homo- or copolymer matrix with an MFR in accordance with ISO 1133 (230° C., 2.16 kg load) of ≥200 g/10 min and (B) 2-30 wt % of an elastomeric ethylene-propylene copolymer having an intrinsic viscosity IV (ISO 1628, with decalin as solvent) of ≤2.8 dl/g and an ethylene content of >50 to 80 wt % and (C) 8-30 wt % of an elastomeric ethylene-propylene copolymer having an intrinsic viscosity IV (ISO 1628, with decalin as solvent) of 3.0-6.5 dl/g and a propylene content of 50 to 80 wt %, the reactor grade thermoplastic polyolefins being obtainable by a multistage polymerization process with at least 3 polymerization steps in the presence of a catalyst system comprising (i) a Ziegler-Natty procatalyst which contains a transesterification product of a lower alcohol and a phthalic ester and (ii) an organometallic cocatalyst and (iii) an external donor represented by the formula

wherein $R^x$ and $R^y$ can be the same or different and represent a hydrocarbon group having 1 to 12 carbon atoms.

The polymer matrix (A) of the reactor grade thermoplastic polyolefins (RTPOs) according to the invention must be a polypropylene matrix (A), which is in the following called propylene matrix (A).

The propylene matrix (A) can be a propylene homopolymer, a propylene copolymer or mixtures thereof, like a homo/random copolymer. However it is preferred that the propylene matrix (A) is a propylene homopolymer.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable.

Where the propylene matrix (A) comprises a propylene copolymer or is a homo/random propylene copolymer, the propylene copolymer comprises monomers copolymerizable with propylene, for example comonomers such as ethylene and $C_4$ to $C_{20}$ alpha-olefins, in particular ethylene and $C_4$ to $C_{10}$ alpha-olefins, e.g. 1-butene or 1-hexene. The comonomer content in the propylene matrix is in such a case preferably relatively low, i.e. up to 4.0 wt %, more preferably 0.1 to 3.0 wt %, still more preferably 0.2 to 2.0 wt %, yet more preferably 0.3 to 1.0 wt %.

The propylene matrix (A) can be unimodal or multimodal, like bimodal. However it is preferred that the propylene matrix (A) is unimodal. Concerning the definition of unimodal and multimodal, like bimodal, it is referred to the definition below.

When the matrix is unimodal with respect to the molecular weight distribution, it may be prepared in a single stage process e.g. a slurry or gas phase process in a slurry or gas phase reactor. Preferably, the unimodal matrix is polymerized as a slurry polymerization. Alternatively, the unimodal matrix may be produced in a multistage process using at each stage process conditions which result in similar polymer properties.

Where the propylene matrix (A) comprises two or more different propylene polymers these may be polymers with different monomer make up and/or with different molecular weight distributions. These components may have identical or differing monomer compositions and tacticities.

Moreover it is preferred that the polymer matrix (A) has a rather high melt flow rate (MFR), i.e. a rather low molecular weight. The melt flow rate measured under a load of 2.16 kg at 230° C. (ISO 1133) is denoted as MFR (230° C.). Accordingly, it is preferred that in the present invention the propylene matrix (A) has an MFR (230° C.) equal to or above 200 g/10 min and up to 500 g/10 min.

As a further requirement of the RTPOs the elastomeric copolymers B and C must fulfill some properties so that the desired results can be achieved.

Accordingly the elastomeric ethylene-propylene copolymer (B) must comprise ethylene in a content of above 50 to 80 wt %, preferably 55 to 75 wt %.

Furthermore the elastomeric ethylene-propylene copolymer (B) must have an intrinsic viscosity IV≤2.8 dl/, preferably ≤2.6 dl/g and more preferably ≤2.4 dl/g.

The elastomeric ethylene-propylene copolymer (C) must comprise propylene in a content of 50 to 80 wt %, preferably 55 to 75 wt %.

Furthermore the elastomeric ethylene-propylene copolymer (C) must have an intrinsic viscosity IV of 3.0 to 6.5 dl/g, preferably 3.2 to 6.0 dl/g and more preferably 3.5 to 6.0 dl/g.

Like the propylene matrix (A) the elastomeric copolymers (B) and (C) can be unimodal or multimodal, like bimodal. However it is preferred that the elastomeric copolymers (B) and (C) are unimodal. Concerning the definition of unimodal and multimodal, like bimodal, it is referred to the definition below.

Of course also the ratio of propylene matrix (A) and elastomeric copolymers (B) and (C) of the RTPOs has some influence on the desired properties; a straightforward example is the adjustment of the impact/stiffness balance.

Thus the RTPOs comprise (a) 40 to 90 wt %, preferably 45 to 85 wt % and more preferably 50 to 80 wt % of the propylene matrix (A) based on the total amount of the RTPO, (b) 2 to 30 wt %, preferably 5 to 25 wt % and more preferably 10 to 20 wt % of the elastomeric ethylene-propylene copolymer (B) and (c) 8 to 30 wt %, preferably 10 to 27 wt % and more preferably 15 to 27 wt % of the elastomeric ethylene-propylene copolymer (C) based on the total amount of the RTPO.

Moreover it is appreciated that the MFR (230° C.) of the RTPO is rather high, i.e. above 20 g/10 min, more preferably above 25 g/10 min and most preferably above 30 g/10 min.

The expressions "multimodal" or "bimodal" or "unimodal" used herein refer to the modality of the polymer, i.e. the form of its molecular weight distribution curve, which is the graph of the molecular weight fraction as a function of its molecular weight. As will be explained below, the polymer components of the present invention are produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution of the final polymer, that curve may show two or more maxima or at least be distinctly broadened when compared with curves for the individual fractions.

The RTPOs of the present invention are produced by multistage process polymerization comprising at least 3 polymerization steps, such as bulk polymerization, gas phase polymerization, slurry polymerization, solution polymerization or combinations thereof.

One skilled in the art is aware of the various possibilities and polymerization reactor systems to produce RTPOs.

Thus, the polymerization system can comprise one or more conventional stirred slurry reactors and/or one or more gas phase reactors. Preferably the reactors used are selected from the group of loop and gas phase reactors and, in particular, the process employs at least one loop reactor and at least two gas phase reactors. It is also possible to use several reactors of each type, e.g. one loop and two or three gas phase reactors, or two loops and two gas phase reactors, in series.

Preferably the process comprises also a prepolymerization with the chosen catalyst system, as described in detail below, comprising the special Ziegler-Natta procatalyst, the special external donor and optionally the cocatalyst.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

The particularly preferred embodiment of the invention comprises carrying out the polymerization in a process comprising either a combination of one loop and two or three gas phase reactors or a combination of two loops and two gas phase reactors.

A preferred multistage process is a slurry-gas phase process, such as developed by Borealis and known as the Borstar® technology. In this respect, reference is made to EP 0 887 379, WO 2004/000899, WO 2004/111095, WO 99/24478, WO 99/24479 and WO 00/68315 incorporated herein by reference.

A further suitable slurry-gas phase process is the Spheripol® process of LyondellBasell.

Preferably the reactor grade thermoplastic polyolefins with high flowability and excellent surface quality according to the invention are produced by using the special Ziegler-Natta procatalysts in combination with a special external donor, as described in detail below, in the Spheripol® or in the Borstar®PP process, more preferably in the Borstar®PP process.

One preferred multistage process may therefore comprise the steps of:

producing a polypropylene polymer matrix in the presence of the chosen catalyst system comprising the special Ziegler-Natty procatalyst in combination with the special external donor and the cocatalyst in at least one slurry reactor transferring the slurry reactor product into a first gas phase reactor (GPR)

producing a first ethylene/propylene-copolymer in the polymer matrix in the presence of the catalyst system in said first GPR transferring the first GPR product into a $2^{nd}$ GPR producing a second ethylene/propylene-copolymer in the polymer matrix in the presence of catalyst system in said $2^{nd}$ GPR recovering the polymer product for further processing, said $1^{st}$ and $2^{nd}$ th ethylene/propylene mixtures having different composition ratios, respectively having different ethylene content and intrinsic viscosities, so that a bimodal rubber composition is obtained.

A further preferred multistage process may comprise the steps of:

producing a polypropylene polymer matrix in the presence of the chosen catalyst system comprising the special Ziegler-Natta procatalyst in combination with the special external donor and the cocatalyst in at least one slurry reactor transferring the slurry reactor product into a first gas phase reactor (GPR), wherein the slurry reactor product is further polymerized in the presence of the catalyst system in said first GPR transferring the first GPR product into a $2^{nd}$ GPR producing a ethylene/propylene-copolymer in the polymer matrix in the presence of catalyst system in said $2^{nd}$ GPR transferring the $2^{nd}$ GPR product into a $3^{rd}$ GPR and producing a second ethylene/propylene-copolymer in the polymer matrix in the presence of catalyst system in said $3^{rd}$ GPR, said $1^{st}$ and $2^{nd}$ ethylene/propylene mixtures having different composition ratios and recovering the polymer product for further processing, yielding a polypropylene polymer matrix containing said $1^{st}$ and $2^{nd}$ ethylene/propylene mixtures having different composition ratios, respectively having different ethylene content and intrinsic viscosities, so that a bimodal rubber composition is obtained.

In a preferred embodiment the composition ratios of said first and second ethylene/propylene mixtures are adjusted so that in the first gas phase reactor (respectively second GPR) a propylene rich EPR rubber is produced in the propylene polymer matrix and in the second gas phase reactor (respectively third GPR) an ethylene rich EPR rubber is produced in the propylene polymer matrix.

Furthermore a molar $H_2/C_2$ ratio between preferably 0.01 to 0.1, more preferably 0.02 to 0.06 should be adjusted in the $1^{st}$ GPR (respectively $2^{nd}$ GPR) and a molar $H_2/C_2$ ratio between preferably 0.15 to 0.6, more preferably 0.20 to 0.4 should be adjusted in the $2^{nd}$ GPR (respectively $3^{rd}$ GPR) to achieve the desired intrinsic viscosities of the two different rubbers.

Nevertheless the GPR polymerisations can also be carried out in reversed order.

With respect to the above-mentioned preferred slurry-gas phase process, the following general information can be provided with respect to the process conditions:

The slurry reactor is operated at temperature of from 40° C. to 110° C., preferably between 50° C. and 100° C., in particular between 60° C. and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor, wherein the temperature preferably is within the range of from 50° C. to 130° C., more preferably 60° C. to 100° C., at a pressure in the range of from 5 to 50 bar, preferably 8 to 35 bar, again with the option of adding hydrogen in order to control the molecular weight, with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

The polymerization process enables highly feasible means for producing and further tailoring the propylene polymer composition within the invention. The precise control of the polymerization conditions and reaction parameters is within the skill of the art.

According to the invention the RTPOs with high flowability and excellent surface quality are obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

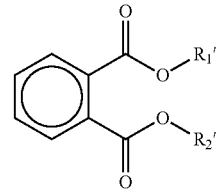

(I)

wherein $R_1'$ and $R_2'$ are independently at least a $C_5$-alkyl under conditions where a transesterification between said $C_1$-$C_2$ alcohol and said dialkylphthalate of formula (I) takes place to form the internal donor c) washing the product of stage b) or d) optionally reacting the product of step c) with $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacted with $TiCl_4$ to form a titanised carrier, followed by the steps of adding to said titanised carrier a dialkylphthalate of formula (I) with $R_1'$ and $R_2'$ being independently at least a $C_5$-alkyl, like at least a $C_8$-alkyl or being the same and being at least a $C_5$-alkyl, like at least a $C_8$-alkyl to form a first product subjecting said first product to suitable transesterification conditions, i.e. at a temperature between 100 to 150° C., such that said methanol or ethanol is transesterified with said ester groups of said dialkylphthalate of formula (I) to form preferably at least 80 mol %, more preferably 90 mol %, most preferably 95 mol %, of a dialkylphthalate of formula (II)

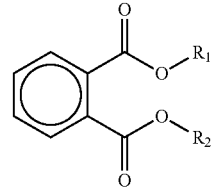

(II)

with $R_1$ and $R_2$ being methyl or ethyl, preferably ethyl, being the internal donor and recovering said transesterification product as the procatalyst composition.

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is then used as the catalyst carrier and reacted to the procatalyst useful in the present invention as described in WO 92/19658 and WO 92/19653.

In the next step the crystallized carrier is reacted with TiCl$_4$ to form a titanised carrier.

A dialkylphthalate of formula (I) is then added to this titanised carrier.

The alkoxy group of the phthalic acid ester used comprises at least 5 carbon atoms and may be different or the same. Preferably the alkoxy group of the phthalic acid ester used comprises at least 8 carbon atoms. More preferably the alkoxy groups $R_1'$ and $R_2'$ are the same.

Still more preferably a dialkylphthalate of formula (I) selected from the group consisting of propylhexylphthalate (PrHP), dioctylphthalate (DOP), di-iso-decylphthalate (DIDP), and ditridecylphthalate (DTDP) is used, yet most preferably the dialkylphthalate of formula (I) is a dioctylphthalate (DOP), like di-iso-octylphthalate or diethylhexylphthalate, in particular diethylhexylphthalate.

When adding the dialkylphthalate of formula (I) it is very likely that an adduct of all the components is produced.

This adduct is then transesterified at a temperature above 100° C. and advantageously between 130 to 150° C.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanisation is repeated after the above treatment in order to ensure a sufficient titanium concentration and thus activity.

Preferably the procatalyst used according to the invention contains 2.5% by weight of titanium at the most, preferably 2.2% by weight at the most and more preferably 2.0% by weight at the most. Its donor content is preferably between 4 to 12% by weight and more preferably between 6 and 10% by weight.

More preferably the procatalyst used according to the invention has been produced by using ethanol as the alcohol and dioctylphthalate (DOP) as dialkylphthalate of formula (I), yielding diethylphthalate (DEP) as the internal donor compound.

Still more preferably the catalyst used according to the invention is the BC-1 catalyst of Borealis or the catalyst Polytrack 8502, commercially available from Grace.

In a further embodiment, the Ziegler-Natta procatalyst can be modified by polymerising a vinyl compound in the presence of the catalyst system, comprising the special Ziegler-Natta procatalyst, an external donor and a cocatalyst, which vinyl compound has the formula:

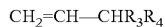

wherein $R_3$ and $R_4$ together form a 5- or 6-membered saturated, unsaturated or aromatic ring or independently represent an alkyl group comprising 1 to 4 carbon atoms, and the modified catalyst is used for the preparation of the polymer composition. The polymerised vinyl compound can act as a nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the RTPOs with high flowability and excellent surface quality according to the invention the catalyst system used preferably comprises in addition to the special Ziegler-Natta procatalyst an organometallic cocatalyst as component (ii). Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by the formula

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. More preferably both $R^x$ and $R^y$ are the same, yet more preferably both $R^x$ and $R^y$ are an ethyl group.

Most preferably diethylaminotriethoxysilane is used as external donor.

The external donor may be produced according to the methods disclosed in EP 1 538 167. The content of this document is herein included by reference.

The current invention also provides a multistage process for producing reactor grade thermoplastic polyolefins using the special catalyst system comprising components (i), (ii) and (iii).

Preferably the catalyst system used comprises
a) a procatalyst composition comprising titanium, magnesium, chlorine and diethylphthalate as internal donor, prepared as disclosed above,
b) diethylaminotriethoxysilane as external donor and
c) triethylaluminium as cocatalyst.

A further aspect of the invention is therefore the use of a catalyst system comprising
a) a procatalyst composition comprising titanium, magnesium, chlorine and diethylphthalate as internal donor, prepared as disclosed above,
b) diethylaminotriethoxysilane as external donor and
c) triethylaluminium as cocatalyst
for producing a reactor grade thermoplastic polyolefin with high flowability and excellent surface quality in a multistage process including at least 3 polymerization steps.

Advantageously an MFR (230° C.) of the RTPO of above 20 g/10 min, more preferably above 25 g/10 min and most preferably above 30 g/10 min can be reached directly with the use of the above described combination of special Ziegler-Natta procatalyst and external donor represented by the formula Si(OCH$_2$CH$_3$)$_3$(NR$^x$R$^y$) without any need of degrading by visbreaking using peroxides.

By using conventional combinations of Ziegler-Natta procatalysts and external donors, as for example ZN104 or the procatalyst described previously and dicyclopentyldimethoxysilane, such high MFR-values for the RTPOs can be achieved only by degrading with peroxides. Due to such a degrading step peroxide residues remain in the end polymer leading to a decrease of purity and increase in odour causing components.

Furthermore, by using the above described combination of special Ziegler-Natta procatalyst and external donor represented by the formula Si(OCH$_2$CH$_3$)$_3$(NR$^x$R$^y$), it is possible to achieve high MFR-values (230° C.) of equal to or above 200 g/10 min for the propylene matrix, with considerably less amounts of fines produced compared to processes using the combination of conventional ZN104 catalyst and dicyclopentyldimethoxysilane as external donor.

The RTPOs according to the invention may comprise conventional adjuvants, such as additives, fillers and reinforcing agents or additional impact modifiers.

The following are optional additives: elastomers, nucleating agents, process and heat stabilisers, UV stabilizers, slip agents, antistatic agents, pigments and other colouring agents including carbon black. Depending on the type of additive, these may be added in an amount of 0.001 to 10 wt % based on the weight of the RTPO.

In a preferred embodiment, the polymer composition includes 1 to 15 wt % based on the weight of the polymer composition, of one or more elastomers. Examples of suitable elastomers include an ethylene/alpha-olefin random copolymer, an ethylene/alpha-olefin/non-conjugated polyene random copolymer, a hydrogenated block copolymer and other elastic polymers or mixtures thereof. Preferred elastomers are elastomeric ethylene-1-octene copolymers.

In a further preferred embodiment, the polymer composition includes 0.05 to 3 wt % based on the weight of the polymer composition of one or more alpha-nucleating agents such as dibenzylidene sorbitol, sodium benzoate, methylen-bis(4,6-di-t-butylphenyl)-phosphate sodium salt (NA-11), aluminium hydroxyl-bis[2,4,8,10-tetrakis(1,1-dimethylethyl)-6-hydroxy-12H-dibenzo-[d,g]-dioxa-phosho-cin-6-oxidato] (NA-21) and di(alkyl-benzylidene)sorbitol or mixtures thereof. The alpha-nucleating agent is usually added in small amounts of 0.0001 to 1 wt %, more preferably 0.001 to 0.7 wt %. Since talc can act both as a nucleating agent and as filler, it can be added in higher amounts. When added as a nucleating agent, talc is preferably added in an amount of 0.05 to 3 wt %, more preferably 0.1 to 2 wt %, most preferably less than 1 wt %, based on the weight of the polymer composition. Further details about these nucleating agents can be found e.g. in WO 99/24479 and WO 99/24501.

Molding resin formulations comprising the RTPO produced according to the invention may further comprise 5 to 60 wt % of one or more particulate of fibrous reinforcing fillers such as glass fiber or carbon fiber, graphite, carbon black or the like, or fillers such as clay, talc and mineral fillers and the like commonly employed in the trade for the manufacture of molded articles and extruded goods.

It is thus a preferred embodiment of the present invention to add 5 to 25 wt % of an inorganic filler, more preferably of talc.

In the preferred embodiments, the additives are added to the RTPO, which is collected from the final reactor of the series of reactors. Preferably, these additives are mixed into the composition prior to or during the extrusion process in a one-step compounding process. Alternatively, a master batch may be formulated, wherein the RTPO is first mixed with only some of the additives.

For mixing, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection molding to generate articles and products of the inventive RTPOs.

RTPO compositions according to the invention may be pelletized and compounded using any of the variety of compounding and blending methods well known and commonly used in the resin compounding art.

The compositions of the current invention are preferably used for the production of molded articles, preferably injection molded articles. Even more preferred is the use for the production of automotive parts, like bumpers, spoilers, fenders, body panels, side bump strips and the like.

The current invention also provides articles comprising the inventive RTPOs with high flowability and excellent surface quality. Preferably, these articles are produced by injection molding.

Surprisingly, it was found that the molded articles manufactured with the RTPO resins prepared according to the invention display excellent surface quality.

The surface quality of injection molded parts, which is determined according to the procedure described in the experimental section, must be "excellent", i.e. only polymer compositions which can be injection molded without showing any flow mark, solve the problem which is underlying the present invention.

EXAMPLES

Methods:
Melt Flow Rate

Unless otherwise specified, the melt flow rate is measured as the MFR in accordance with ISO 1133 (230° C., 2.16 kg load) for polypropylene and is indicated in g/10 min. The MFR is an indication of the flowability, and hence the processability, of the polymer. The higher the melt flow rate, the lower the viscosity of the polymer.

Comonomer content was measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$— absorption peak (800-650 $cm^{-1}$) was measured with Perkin Elmer FTIR 1600 spectrometer. The method was calibrated by ethylene content data measured by $^{13}$C-NMR.

Flexural modulus was measured according to ISO 178 by using injection molded test specimens as described in EN ISO 1873-2 (80×10×4 mm)

Xylene Solubles

The xylene soluble fraction (XS) as defined and described in the present invention was determined as follows: 2.0 g of the polymer are dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\% = (100 \times m_1 \times v_0)/(m_0 \times v_1),$$

wherein $m_0$ designates the initial polymer amount (grams), $m_1$ defines the weight of residue (grams), $v_0$ defines the initial volume of solvent taken (250 milliliters) and $v_1$ defines the volume of the aliquot taken for determination (analysed sample; 100 milliliters).

The intrinsic viscosity (IV) value increases with the molecular weight of a polymer. The IV values were measured according to DIN EN ISO 1628-1 in Decalin at 135° C.

The tensile modulus was measured according to ISO 572-3 at 1 mm/min and 23° C. Test specimens as described in EN ISO 1873-2 (80×10×4 mm) were used.

Charpy, notches impact strength (NIS), was measured according to ISO 179/1 eA at +23° C., 0° C. and at −20° C. by using injection molded test specimens as described in EN ISO 1873-2 (80×10×4 mm)

Shrinkage was measured according to an internal standard using 150×80×2 mm injection molded plaques. Measurements were performed after injection and conditioning at room temperature for at least 96 h in the flow direction and perpendicular to the flow direction. Following conditions were used for injection molding: injection time: 3 s, melt temperature: 240° C., mold temperature: 50° C., hold pressure: from 73 to 23 bars in 10 steps, hold time: 10 s, cooling time: 20 s.

The fines were determined by sieving the polymer powder according to ASTM D1921-06. The screen set consisted of screens having openings of 4,000 mm; 2,800 mm; 2,000 mm; 1,400 mm; 1,000 mm; 0,500 mm; 0,180 mm; 0,106 mm and 0,053 mm.

The powder passing the 0,180 mm screen was considered as fines.

Zinc oxide was used as antistat.

Example 1: Preparation of Base Resin According to the Invention

The base resin was produced in a plant having a prepolymerization reactor, a loop reactor and two fluid bed gas-reactors connected in series. The catalyst used in the polymerization was prepared according to WO 92/19653 with DOP as dialkylphthalat of the formula (I) and ethanol as alcohol, the cocatalyst was Triethylaluminium (TEA) and as an external donor (D) diethylamino triethoxy silane was used.

After a first pre-polymerisation step the catalyst system was fed to the slurry reactor, where the polymerisation of the polypropylene homopolymer matrix phase was performed. The slurry phase loop reactor was then followed by a first gas phase reactor in series, in which a first elastomeric rubber disperse phase was produced by copolymerisation of propylene with ethylene comonomer. The polymerisation temperature in the slurry phase loop reactor was 62° C., whereas the temperature in the first gas phase reactor was 80° C. After transfer to a second gas phase reactor the second ethylene/propylene copolymer was produced. The operating temperature in the second gas phase reactor was 80° C.

The split between loop, $1^{st}$ GPR and $2^{nd}$ GPR was: 70.5%:17.0%:12.5%

Reaction Conditions:

1) Prepolymerization

| | |
|---|---|
| T [° C.] | 20 |
| TEA/D [g/g] | 3 |
| TEA/$C_3$ [g/kg] | 0.20 |

2) Loop

| | |
|---|---|
| Reactor-T [° C.] | 62 |
| Pressure [bar] | 34 |
| MFR [g/10 min] | 253 |
| $H_2$ [ppm] | 8800 |
| $C_2$ [wt %] | 0.0 |
| XS [wt %] | 2.5 |

3) $1^{st}$ Gas Phase Reactor

| | |
|---|---|
| Reactor-T [° C.] | 80 |
| Pressure [bar] | 12 |
| $C_2$ [wt %] | 8.0 |
| $H_2/C_2$ [mol/mol] | 0.022 |
| $C_2/C_2 + C_3$ [mol %/mol %] | 0.270 |
| $C_3$/EPR [wt %] | 59.5 |
| IV/XS [dl/g] | 3.64 |
| MFR [g/10 min] | 77 |
| XS [wt %] | 17.8 |

4) $2^{nd}$ Gas Phase Reactor

| | |
|---|---|
| Reactor-T [° C.] | 80 |
| Pressure [bar] | 12 |
| $C_2$ [wt %] | 20.3 |
| $H_2/C_2$ [mol/mol] | 0.28 |
| $C_2/C_2 + C_3$ [mol %/mol %] | 0.670 |
| $C_3$/EPR [wt %] | 48.5 |
| IV/XS [dl/g] | 2.81 |
| MFR [g/10 min] | 38.0 |
| XS [wt %] | 23.2 |

Values for $C_3$/EPR, IV/XS, MFR and XS of the $2^{nd}$ Gas phase reactor product are total values for the final RTPO.

Since the IV of the EPR produced in the $2^{nd}$ Gas phase reactor (IV/XS$_{(EPR\ 2nd\ GPR)}$) can not be measured directly it has been calculated using the following formula:

$$IV/XS_{(EPR\ 2nd\ GPR)} = [(IV_{total} \times w_{total}) - (IV_{(EPR\ 1st\ GPR)} \times w_{1st\ GPR})]/w_{2nd\ GPR}$$

Where:

$IV_{total}$ is the IV of the fraction soluble in xylene of the final composition $W_{total}$=100% EPR [the sum of polymer splits for the $1^{st}$ and the $2^{nd}$ gas phase reactor (17%+12.5%=29.5%) represents the total of EPR (100% EPR) produced]

$IV_{(EPR\ 1st\ GPR)}$ is the IV of the fraction soluble in xylene produced in the $1^{st}$ gas phase reactor $W_{1st\ GPR}$ is the percentage of ERR produced in the $1^{st}$ gas phase reactor based on 100% EPR [(17%$_{polymer\ split\ for\ 1stGPR}$×100%$_{EPR\ total}$)/29.5%$_{sum\ of\ polymer\ splits\ for\ 1st\ and\ 2nd\ GPR}$]

$W_{2nd\ GPR}$ is the percentage of EPR produced in the $2^{nd}$ gas phase reactor based on 100% EPR [(12.5%$_{polymer\ split\ for\ 2ndGPR}$×100%$_{EPR\ total}$)/29.5%$_{sum\ of\ polymer\ splits\ for\ 1st\ and\ 2nd\ GPR}$]

The IV of the fraction soluble in xylene produced in the $2^{nd}$ gas phase reactor was therefore 1.68 dl/g The $C_3$-amount of the EPR produced in the $2^{nd}$ Gas phase reactor ($C_3$/EPR$_{EPR\ 2nd\ GPR}$) has been calculated accordingly using the following formula:

$$C_3/EPR_{(EPR\ 2nd\ GPR)} = [(C_3/EPR_{total} \times w_{total}) - (C_3/EPR_{(EPR\ 1st\ GPR)} \times w_{1st\ GPR})]/w_{2nd\ GPR}$$

Where:

$C_3$/EPR$_{total}$ is the $C_3$-amount of the ERR of the final composition $W_{total}$=100% EPR [the sum of polymer splits for the $1^{st}$ and the $2^{nd}$ gas phase reactor (17%+12.5%=29.5%) represents the total of EPR (100% EPR) produced]

$C_3$/EPR$_{(EPR\ 1st\ GPR)}$ is the $C_3$-amount of the EPR produced in the $1^{st}$ gas phase reactor $W_{1st\ GPR}$ is the percentage of EPR produced in the $1^{st}$ gas phase reactor based on 100% EPR [(17%$_{polymer\ split\ for\ 1st\ GPR}$×100%$_{EPR\ total}$)/29.5%$_{sum\ of\ polymer\ splits\ for\ 1st\ and\ 2nd\ GPR}$]

$W_{2nd\ GPR}$ is the percentage of EPR produced in the $2^{nd}$ gas phase reactor based on 100% EPR [(12.5%$_{polymer\ split\ for\ 2nd\ GPR}$×100%$_{EPR\ total}$)/29.5%$_{sum\ of\ polymer\ splits\ for\ 1st\ and\ 2nd\ GPR}$]

The $C_3$-amount of the EPR produced in the $2^{nd}$ gas phase reactor was therefore 33.54 wt %

This value complies with datas evaluated by using so-called master curves.

Such master curves were generated by determining the $C_3$-amount of an EPR produced in the first gas phase reactor of the above described reactor set up using the same catalyst system as described above but different $C_2/C_2+C_3$ ratios, leading to corresponding $C_3$-amounts in the EPR. From these master curves an art skilled person can determine the $C_3$-amount of the EPR produced in the $2^{nd}$ gas phase reactor using a special $C_2/C_2+C_3$ ratio.

Example 2

In order to show the advantageousness of the catalyst system used according to inventive Example 1 in comparison to the catalyst system used according to EP 1 600 480 (ZN104 (commercially available from LyondellBasell), triethylaluminium as cocatalyst and dicyclopentyldimethoxysilane as external donor) regarding fines produced during production of the polypropylene matrix, several polypropylene matrices with different MFR were produced in the above described plant set up and the amount of fines produced in the loop reactor were determined by sieving the polymer powder obtained from the loop reactor. The powder passing a 0.180 mm screen was considered as fines.

TABLE 1

| | wt % of fines | |
|---|---|---|
| MFR$_{PP-matrix}$ [g/10 min] | ZN104/DCDMS | Cat. of Example 1/DEATES |
| 50 | 2.5 wt % | 0.9 wt % |
| 100 | 5.4 wt % | 1.2 wt % |
| 250 | n.a. | 1.4 wt % |

DCDMS . . . dicyclopentyl dimethoxy silane
DEATES . . . diethylamino triethoxy silane
n.a . . . not applicable With the combination of ZN104/DCDMS it was not possible to produce a polypropylene matrix with an MFR of above 100 g/10 min, especially of 250 g/10 min due to the high amount of fines produced, which block the reactor.

Example 3: Testing of the Base Resin

The base resin (RTPO) was initially obtained in powder form.

The resin together with 10 wt % Tital15 (talc from Ankerport) and 0.1% NA11 as well as 10 wt % of EG8200 (elastomer Engage®8200 from DuPont Dow Elastomers) were pelletized by feeding the blend to a Prism 24 twin-screw extruder (Prism Ltd., Staffordshire, UK). The polymer was extruded through a strand die, cooled and chopped to form pellets.

TABLE 2

| Properties of compounded RTPO | |
|---|---|
| MFR 230° C./2, 16 kg [g/10'] | 29.2 |
| Flexural Modulus [MPa] | 1281 |
| Tensile Modulus [MPa] | 1229 |

TABLE 2-continued

| Properties of compounded RTPO | |
|---|---|
| Impact - Charpy NIS(23° C.) [kJ/m²] | 17.5 |
| Impact - Charpy NIS(0° C.) [kJ/m²] | 8.2 |
| Impact - Charpy NIS(−20° C.) [kJ/m²] | 5.5 |
| Shrinkage longitudinal [%] | 0.58 |
| Shrinkage lateral [%] | 0.9 |

Surface Quality (Tigerskin)

Plaques of a dimension of 210×189×3 mm³, grained with VW grain K50, were produced under following conditions:
Melt temperature: 240° C.
Mold temperature: 30° C.
Dynamic pressure: 10 bar hydraulic The filmgate over the whole width had a thickness of 1.4 mm.

With the above mentioned conditions 5 plaques with different injection speed were produced. The test series were done with following screw advance velocities:

10, 20, 42, 60, 75 mm/sec, where the screw diameter was 50 mm and different injection times of 8, 4, 2, 1.5 and 1 sec.

The produced plaques are judged visually by a tester in terms of tigerskin.

The tigerskin level was assessed by a number between 1 (no flow mark "excellent") and 5 (a large area of flow marks, "insufficient") according to FIG. 3.

TABLE 3

| Tigerskin level: | | | | | |
|---|---|---|---|---|---|
| Injection time [sec] | 1 | 1.5 | 2 | 4 | 8 |
| | 1 | 1 | 1 | 1 | 1 |

Result: With the RTPO of the present invention no flow marks could be seen, independently of the test conditions; the surface quality was in each case excellent.

We claim:
1. A catalyst system, comprising:
(i) a Ziegler-Natta procatalyst which contains a transesterification product of a lower alcohol and a phthalic acid ester and
(ii) an organometallic cocatalyst and
(iii) external donor represented by the formula

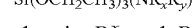

Si(OCH$_2$CH$_3$)$_3$(NR$_x$R$_y$)

wherein R$^x$ and R$^y$ can be the same or different a represent a hydrocarbon group having 1 to 12 carbon atoms,
suitable for producing a reactor grade thermoplastic polyolefin in a multistage process with at least 3 polymerization steps,
said reactor grade thermoplastic polyolefin having an MFR (230° C.) of greater than 30 g/10 min and comprising
(A) 40-90 wt % of a propylene homo- or copolymer matrix with an MFR$_2$ in accordance with ISO 1133 (230° C., 2.16 kg load) of 200 g/10 min and
(B) 2-30 wt % of an elastomeric ethylene-propylene copolymer having an intrinsic viscosity IV (according to ISO 1628 with decalin as solvent) of ≤2.8 dl/g and an ethylene content of in the range of 50 to 75 wt % and
(C) 15-27 wt % of an elastomeric ethylene-propylene copolymer having an intrinsic viscosity IV (according to ISO 1628 with decalin as solvent) of 3.0-6.5 dl/g and a propylene content of 50 to 80 wt %.

2. The catalyst system according to claim 1, wherein the Ziegler-Natta procatalyst (i) has been prepared by
   a) reacting a spray crystallized or emulsion solidified adduct of $MgCl_2$ and a $C_1$ to $C_2$ alcohol with $TiCl_4$
   b) reacting the product of stage a) with a dialkylphthalate of formula (I)

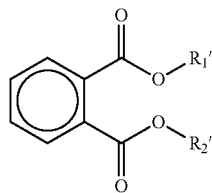

(I)

wherein $R_1'$ and $R_2'$ are independently at least a $C_5$ alkyl
   under conditions where a transesterification between said $C_1$ to $C_2$ alcohol and said dialkylphthalate of formula (I) takes place to form an internal donor
   c) washing the product of stage b) and
   d) optionally reacting the product of step c) with $TiCl_4$.

3. The catalyst system according to claim 2, wherein the dialkylphthalate of formula (I) is dioctylphthalate and that the $C_1$ to $C_2$ alcohol is ethanol.

4. The catalyst system according to claim 1, wherein the organometallic cocatalyst (ii) is selected from the group consisting of trialkylaluminium, dialkyl aluminium chloride and alkyl aluminium sesquichloride.

5. The catalyst system according to claim 4, wherein the organometallic cocatalyst (ii) is triethylaluminium.

6. The catalyst system according to claim 1, wherein the external donor (iii) is diethylaminotriethoxysilane.

7. The catalyst system of claim 1, further comprising the reaction grade thermoplastic polyolefin produced by the catalyst system and said at least 3 polymerization steps.

8. The catalyst system of claim 2, further comprising the reaction grade thermoplastic polyolefin produced by the catalyst system and said at least 3 polymerization steps.

9. The catalyst system of claim 3, further comprising the reaction grade thermoplastic polyolefin produced by the catalyst system and said at least 3 polymerization steps.

10. The catalyst system of claim 4, further comprising the reaction grade thermoplastic polyolefin produced by the catalyst system and said at least 3 polymerization steps.

11. The catalyst system of claim 5, further comprising the reaction grade thermoplastic polyolefin produced by the catalyst system and said at least 3 polymerization steps.

12. The catalyst system of claim 6, further comprising the reaction grade thermoplastic polyolefin produced by the catalyst system and said at least 3 polymerization steps.

* * * * *